(12) United States Patent
Atwater et al.

(10) Patent No.: US 7,840,981 B2
(45) Date of Patent: Nov. 23, 2010

(54) METHOD AND APPARATUS FOR RECEIVING FULL-MOTION DIGITAL VIDEO MULTI-CASTS, INTERACTIVE DATA AND INTERACTIVE VOICE VIA A DSL CIRCUIT

(75) Inventors: Antonio Atwater, Crystal Bay, NV (US); Edward C. Drake, Reno, NV (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1095 days.

(21) Appl. No.: 09/843,289

(22) Filed: Apr. 24, 2001

(65) Prior Publication Data

US 2002/0048275 A1    Apr. 25, 2002

Related U.S. Application Data

(63) Continuation of application No. 08/991,391, filed on Dec. 16, 1997, now abandoned.

(51) Int. Cl.
*G06F 3/00* (2006.01)
(52) U.S. Cl. .......................................... 725/51; 725/116
(58) Field of Classification Search ................. 370/390, 370/401, 400, 43.8, 439, 485, 486, 437, 488, 370/493, 494, 495, 230, 252, 329–330, 341, 370/345–346, 352, 395.2, 431–433, 449–450, 370/902; 709/200, 203, 206, 223, 225, 227, 709/228, 232, 229, 217; 707/10, 104.1; 725/100, 725/116.93, 97, 87, 37–61
See application file for complete search history.

(56) References Cited

U.S. PATENT DOCUMENTS

| | | |
|---|---|---|
| 5,179,556 A | 1/1993 | Turner |
| 5,305,311 A | 4/1994 | Lyles |
| 5,410,343 A | 4/1995 | Coddington et al. |
| 5,434,855 A | 7/1995 | Perlman et al. |
| 5,511,168 A | 4/1996 | Perlman et al. |
| 5,534,912 A * | 7/1996 | Kostreski ..................... 725/100 |

(Continued)

FOREIGN PATENT DOCUMENTS

CA    2251085    3/2005

(Continued)

OTHER PUBLICATIONS

Hari et al, Techniques for improving the Capacity of Video on Demand Systems, IEEE, 1996, pp. 308-315.*

(Continued)

*Primary Examiner*—Ricky Ngo
*Assistant Examiner*—Phuongchau B Nguyen
(74) *Attorney, Agent, or Firm*—Michael Haynes PLC; Michael N. Haynes

(57) ABSTRACT

An IP multicast aware switched digital method and apparatus are provided in a settop unit wherein packet streams containing reference information are multicast while a select set of program information is routed to the settop units so that multicast streams can be identified and full content can be routed individually to the settop unit for decoding. Specific or preferred embodiment applications include simultaneous output and interactive communication with a television (true video on demand), computer (Internet access), videophone and telephone.

77 Claims, 8 Drawing Sheets

U.S. PATENT DOCUMENTS

| | | | |
|---|---|---|---|
| 5,594,490 A | 1/1997 | Dawson et al. | |
| 5,594,789 A | 1/1997 | Seazholtz et al. | |
| 5,608,447 A * | 3/1997 | Farry et al. | 725/116 |
| 5,699,105 A | 12/1997 | Chen et al. | |
| 5,706,507 A * | 1/1998 | Schloss | 707/104.1 |
| 5,708,780 A * | 1/1998 | Levergood et al. | 709/229 |
| 5,754,641 A | 5/1998 | Voit et al. | |
| 5,761,662 A * | 6/1998 | Dasan | 707/10 |
| 5,781,226 A | 7/1998 | Sheehan | |
| 5,790,173 A | 8/1998 | Strauss et al. | |
| 5,790,548 A | 8/1998 | Sistanizadeh et al. | |
| 5,793,411 A | 8/1998 | Hiraizumi | |
| 5,802,284 A * | 9/1998 | Karlton et al. | 709/217 |
| 5,805,154 A | 9/1998 | Brown | |
| 5,835,717 A | 11/1998 | Karlton et al. | |
| 5,893,091 A * | 4/1999 | Hunt et al. | 709/206 |
| 5,903,559 A * | 5/1999 | Acharya et al. | 370/355 |
| 5,923,361 A * | 7/1999 | Sutton, Jr. | 725/93 |
| 5,941,951 A * | 8/1999 | Day et al. | 709/233 |
| 5,961,603 A * | 10/1999 | Kunkel et al. | 709/229 |
| 5,982,445 A | 11/1999 | Eyer et al. | |
| 5,983,005 A * | 11/1999 | Monteiro et al. | 370/351 |
| 5,991,306 A * | 11/1999 | Burns et al. | 370/429 |
| 6,009,099 A * | 12/1999 | Lewis et al. | 370/397 |
| 6,011,782 A * | 1/2000 | DeSimone et al. | 370/252 |
| 6,038,601 A * | 3/2000 | Lambert et al. | 709/226 |
| 6,047,327 A * | 4/2000 | Tso et al. | 709/232 |
| 6,061,392 A | 5/2000 | Bremer et al. | |
| 6,081,533 A | 6/2000 | Laubach et al. | |
| 6,097,720 A | 8/2000 | Araujo et al. | |
| 6,101,180 A | 8/2000 | Donahue et al. | |
| 6,138,141 A * | 10/2000 | DeSimone et al. | 709/203 |
| 6,138,144 A * | 10/2000 | DeSimone et al. | 709/204 |
| 6,141,003 A * | 10/2000 | Chor et al. | 715/719 |
| 6,226,642 B1 * | 5/2001 | Beranek et al. | 707/10 |
| 6,226,686 B1 * | 5/2001 | Rothschild et al. | 709/245 |
| 6,259,701 B1 * | 7/2001 | Shur et al. | 370/401 |
| 6,324,163 B1 * | 11/2001 | Alexander et al. | 370/229 |
| 6,331,983 B1 * | 12/2001 | Haggerty et al. | 370/400 |
| 6,346,964 B1 * | 2/2002 | Rogers et al. | 370/430 |
| 6,370,142 B1 * | 4/2002 | Pitcher et al. | 370/401 |
| 6,397,387 B1 * | 5/2002 | Rosin et al. | 725/52 |
| 6,414,952 B2 * | 7/2002 | Foley | 370/352 |
| 6,418,148 B1 * | 7/2002 | Kumar et al. | 370/468 |
| 6,510,461 B1 * | 1/2003 | Nielsen | 709/224 |
| 2001/0054062 A1 * | 12/2001 | Ismael et al. | 709/202 |
| 2006/0015906 A1 * | 1/2006 | Boyer et al. | 725/51 |
| 2006/0233171 A1 * | 10/2006 | Murray et al. | 370/390 |
| 2006/0253599 A1 * | 11/2006 | Monteiro et al. | 709/230 |

FOREIGN PATENT DOCUMENTS

| | | |
|---|---|---|
| JP | 8336127 | 12/1996 |
| WO | WO97/42582 | 11/1997 |

OTHER PUBLICATIONS

Xylomenos et al, IP Multicasting for Point to Point Local Distribution, IEEE, 1997, pp. 1380-1387.*

Internetworking with TCP/IP, 2nd Edition, First vol. (p. 92, 107, 281-291), 1999.

Bachs et al., "Supporting Multicast in ADSL Networks," ATM Workshop 1999, IEEE Proceedings (pp. 301-306), 1999.

Whetten et al., "An Overview of Reliable Multicast Transport Protocol II," IEEE Network, vol. 14, Issue 1 (pp. 37-47), Jan.-Feb. 2000.

Armitage, "IP Multicasting over ATM Networks", Apr. 1, 1997, pp. 445-457, IEEE Journal on Selected Areas in Communications, vol. 15, No. 3.

Abe, "IP Multicast Over Large Scale Networks", Oct. 31, 1997, IECE Technical Report, SSE97, 126-139, Japan.

Comer, "Internetworking with TCP/IP 2nd Edition, 1991. vol. 1, Principles, Protocols, and Architecture", 1991, 92-107, 281-291 page(s), Prentice Hall, Inc.

* cited by examiner

METHOD AND APPARATUS FOR RECEIVING FULL-MOTION DIGITAL VIDEO MULTI-CASTS, INTERACTIVE DATA AND INTERACTIVE VOICE VIA A DSL CIRCUIT

CROSS-REFERENCE TO RELATED APPLICATION

This application is a continuation of U.S. patent application Ser. No. 08/991,391 filed Dec. 16, 1997, now abandoned which is hereby incorporated by reference in its entirety.

BACKGROUND OF THE INVENTION

This invention relates to the transmission of digital multimedia communication information to end user subscribers via bandwidth limited circuits, and more particularly to digital subscriber line (DSL) network transmission.

The quest to make television a truly interactive medium has spurred technical development in the transmission of digital video. Heretofore, technical development in this arena focused primarily on digital data network connectivity and specifically on connectivity to the Internet. This prior focus on network bridging for video on demand (VoD), Internet access, and digital compression technology is in part driven by the perceived notion of maintaining compatibility with conventional bus type cable television plants.

The connectionless network paradigm, which serves as the basis of the Internet, does not commit network resources to particular conversations as is done in circuit switched networks. Rather, it is based upon a packet switching paradigm in which all information travels across a connectionless network without a specified route. While this paradigm is ideally suited to the world of "bursty" information delivery, applications such as digital video distribution require the capability to specify minimum bandwidth, controlled response times, and other Quality of Service (QoS) parameters inherent to a circuit switched paradigm. Known mechanisms for specifying the QoS needed are rudimentary at best in the connectionless network model. As a result, current connectionless, "best-effort" technological paradigms are not suited for true switched video applications.

Switched circuit technology stands as a promising alternative. Switched network technology serves as the basis of the public switch telephone network. In switched networks, conversations take place via a dedicated channel path established between the two conversing parties. This permits the quality of service of the network connection to be guaranteed. Switched circuit communication is typically performed via a twisted pair line terminating in simple jack in the subscriber's household, but the underlying technology is suited to fiber optic, coaxial cable and wireless connections up to the end user. For example, leading edge development in the switched network arena has produced the Asynchronous Transfer Mode (ATM), a high speed, multiprotocol, fiber optic network. ATM accommodates high bandwidth applications requiring certain QoS minimums, such as desktop video conferencing, imaging and voice transmission.

Internet Protocol (IP), the ubiquitous workhorse protocol of the Internet, has gained widespread popularity due to its universal compatibility with virtually any network design. The field of end-user interface devices or so-called "settop" arena has also embraced IP technology. For example, vendors of settop units such as Stellar One Corporation of Seattle, Wash. and Acorn Computer Company (a.k.a. Online Media) of Cambridge, England have produced "IP-aware" settop units. Internet IP compatibility is a highly desirable feature for providing the seamless integration of television, Internet, videophone and telephone services.

One notable problem with using switch circuit technology for the distribution of digital video is that bandwidth is typically limited in digital subscriber line circuits to about 4 MPBS downstream to the end user and approximately 640 KBPS upstream. In light of the foregoing, what is needed is a technique for distributing digital video information as well as Internet access and telephone information over a limited bandwidth medium using the switched circuit paradigm.

SUMMARY OF THE INVENTION

According to the invention an IP multicast aware switched digital method and apparatus are provided in a settop unit wherein packet streams containing reference information are multicast while a select set of program information is routed to the settop units so that multicast streams can be identified and full content can be routed individually to the settop unit for decoding.

Specific or preferred embodiment applications include simultaneous output and interactive communication with a television (true video on demand), computer (Internet access), videophone and telephone. While the details of the interface with the end user terminal are not a part of the invention, it is noteworthy that the present invention is capable of delivering multiple interactive two-way communication services, including broadcast-quality video over conventional twisted-pair telephone cabling.

Specifically, in a particular asymmetric embodiment according to the invention, information representing available programming content is fed to the end user or settop unit and the end user selects one or more of the programming content services to be delivered. Thereupon dynamic switched virtual circuits are established between the end user unit and a central office via a Digital Subscriber Line (DSL) circuit. Termination of the dynamic switched virtual circuit releases bandwidth with minimal loss of efficiency so the physical medium is available for other uses.

An advantage of a point-to-point network as herein described is that security is enhanced over a comparable cable television bus network.

A further advantage is that the system is truly interactive over the same media which delivers the services.

A still further advantage is the suitability of the system for multiple simultaneous service uses.

A still further advantage is dedicated transport bandwidth for end users.

Other advantages will be apparent upon reference to the following detailed description in connection with the accompanying drawings.

DESCRIPTION OF SPECIFIC EMBODIMENTS

A preferable embodiment of a digital video and interactive data and voice system according to the invention has been reduced to practice and will be made available under the trade name "CHAS™" or "CHANNEL ANNOUNCEMENT SERVICE™."

System Overview

Figure 1A:
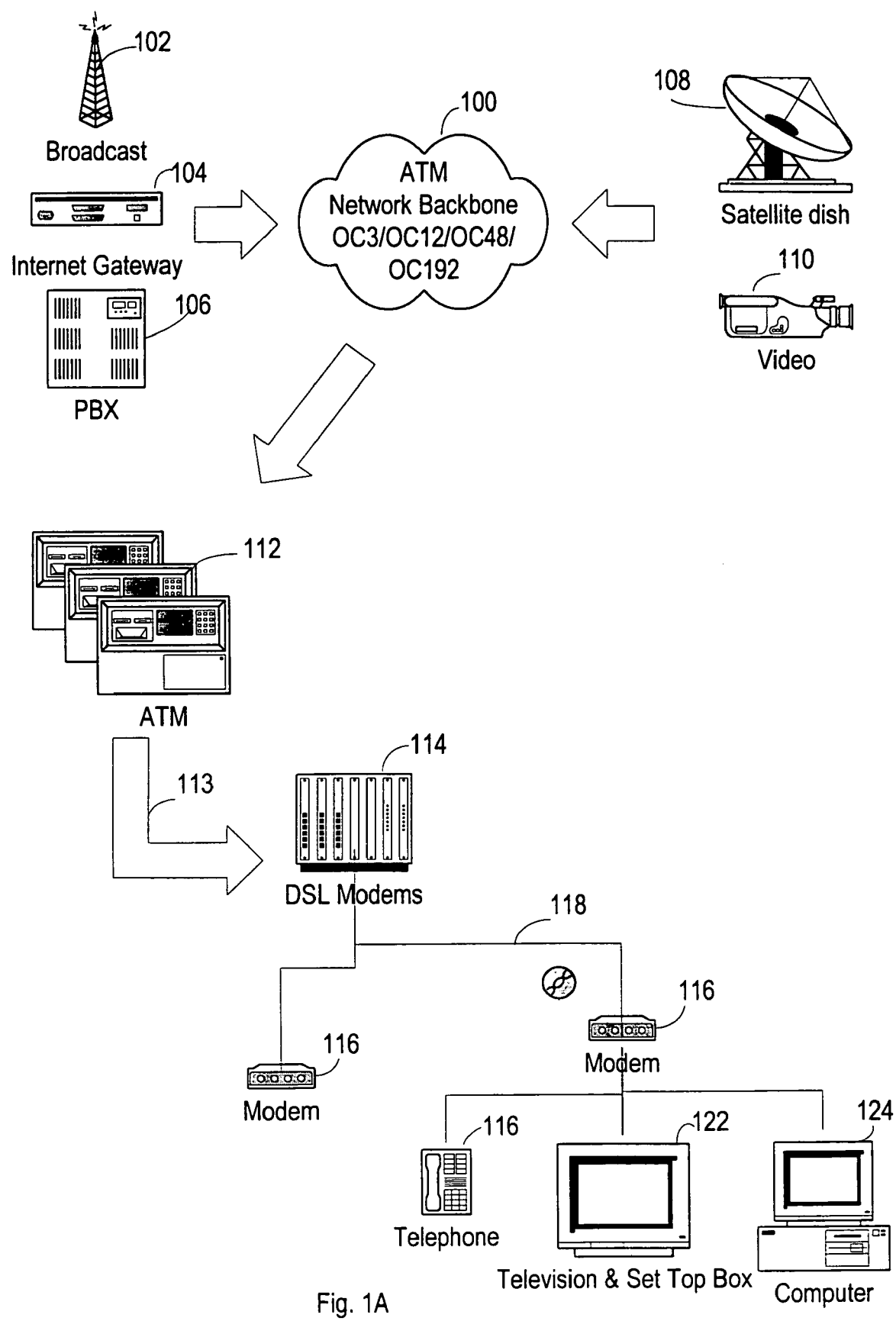
FIG. 1A depicts a representative environment in which embodiments of the invention may be practiced.

FIG. 1A depicts a representative environment according to the invention. Central to FIG. 1 is a network with ATM network backbone 100. This ATM network is capable of fiber data rates of OC3, OC12, OC48, OC192 or as is available in the art. A plurality of content providers place information onto ATM network 100. Typical sources of content served include broadcast information 102, Internet information 104, telenetwork 106, broadcast content 108, and video 110. In a representative central plant, a plurality of ATM switches 112 interface with network 100 to receive and distribute data from the various content sources. Information flows from ATM switches 112 via a plurality of paths 113 to a plurality of DSL modems 114. DSL modems 114 connect via DSL twisted pair lines 118 to a plurality of modems 116 in various subscribers residences or establishments. From a representative modem 116, there can be attached a telephone 120 and/or a television set via settop box 122, and/or a computer 124.

Figure 1B:
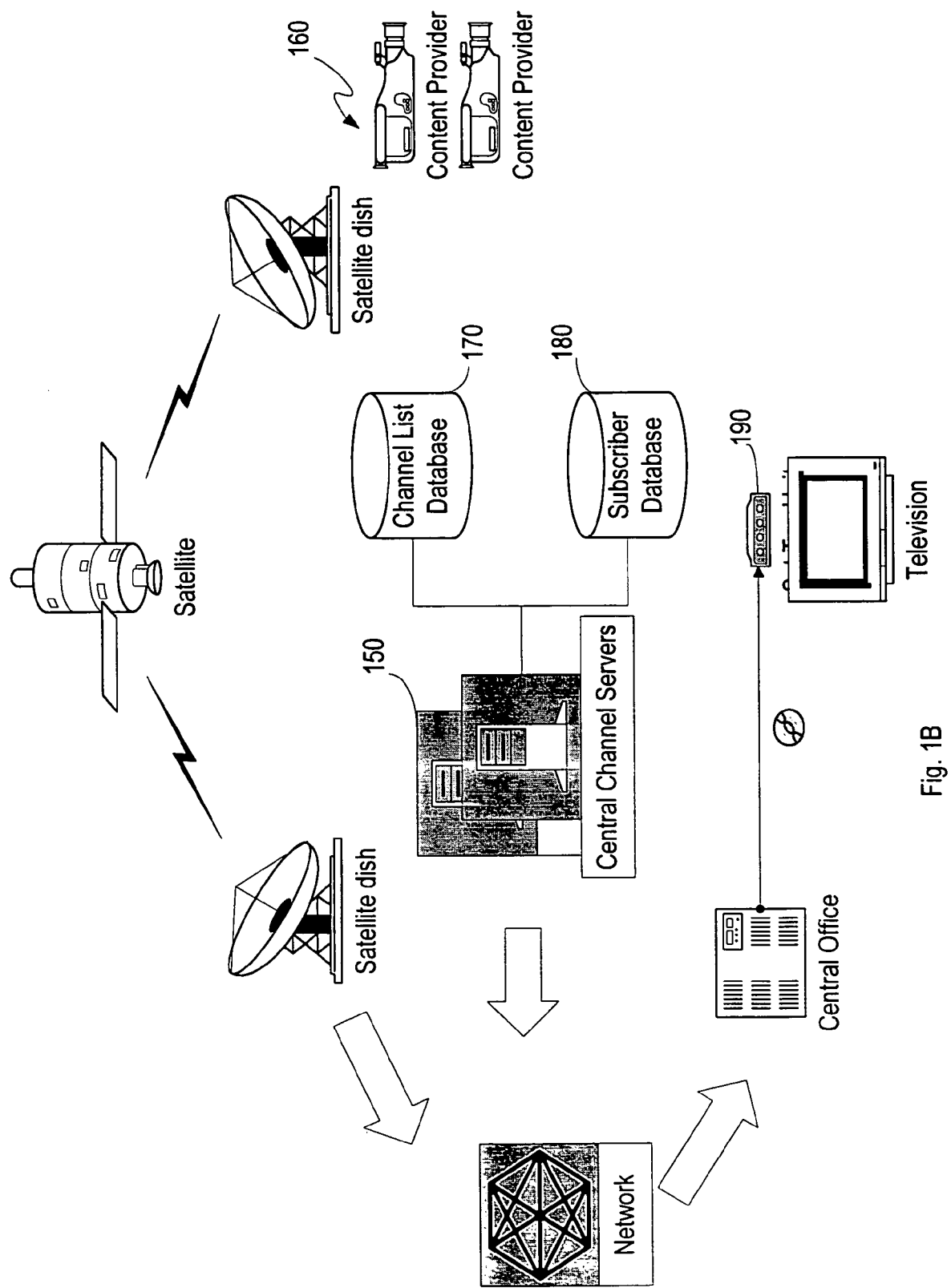
FIG. 1B depicts a central channel server, programming content providers and subscriber settop box clients according to a particular embodiment of the invention.

FIG. 1B depicts an overview of a digital programming content distribution system according to a particular embodiment of the present invention. One or more central channel server(s) 150 collect(s) information about available programming services distributed from a multiplicity of content providers 160. In a preferable embodiment, this information is multicast by the content providers using the session announcement protocol. Channel server 150 maintains a channel list database 170 which tracks available content channel offerings and a subscriber database 180, which contains subscriber identifications and permitted channels for each subscriber. Subscribers 190 interact with central channel server 150 to obtain programming content information, and with content providers 160 to obtain programs.

In related embodiments, the channel server 150 and content providers 160 may be co-located on the same machine, or may reside on separate machines.

In related embodiments, subscriber database 180 and channel list database 170 may be co-located on the same machine, or may reside on separate machines.

End User Hardware Overview

Figure 2A:
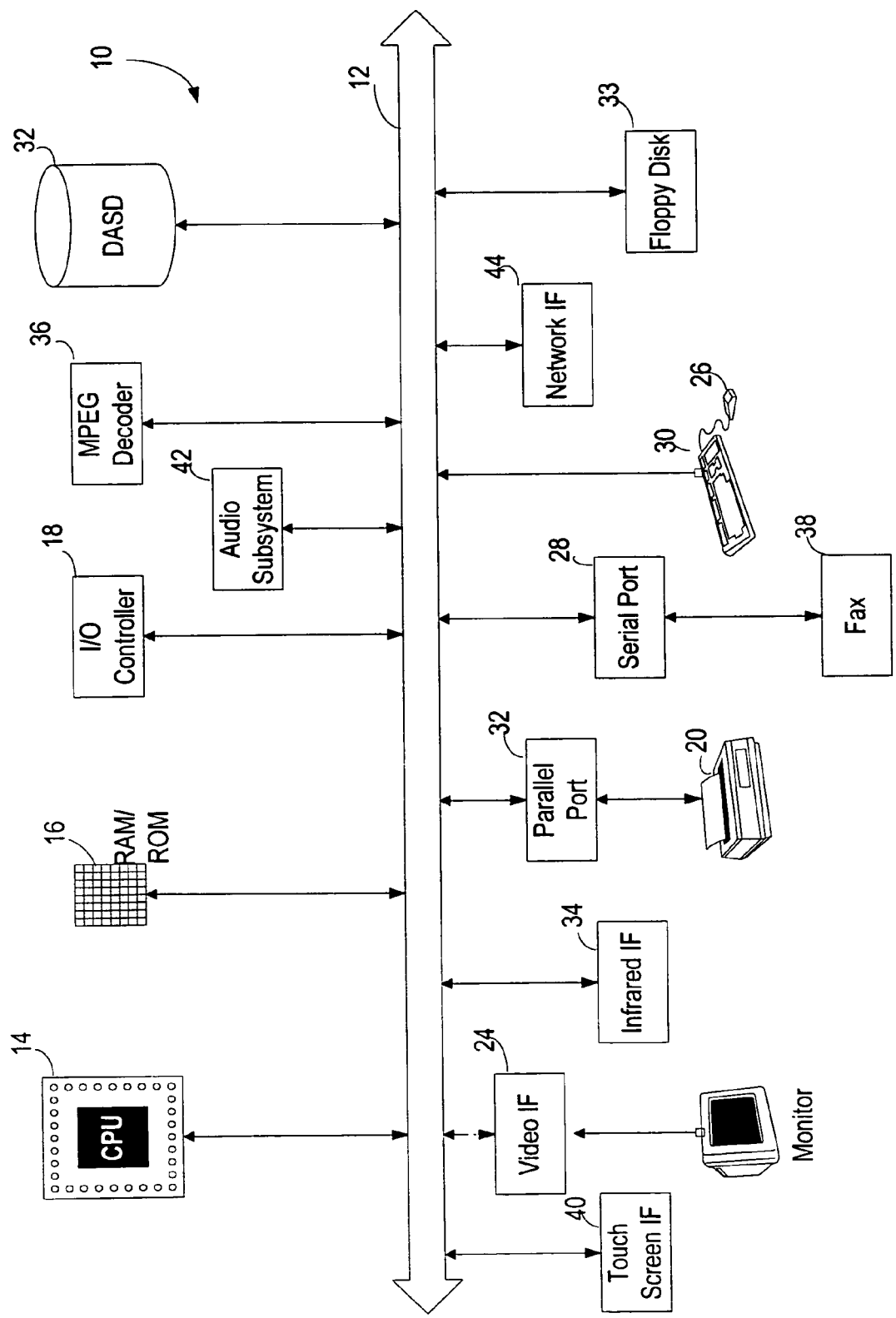
FIG. 2A depicts a functional view of settop box hardware in accordance with a particular embodiment of the invention.

In a representative embodiment, the invention may be practiced using a settop box with the basic subsystems and functions depicted in FIG. 2A. In the representative system of FIG. 2A, a settop unit 10 includes bus 12, which is shown schematically as a single bus, but can also be a number of buses such as a local bus and one or more expansion buses (e.g., ADB, SCSI, ISA, EISA, MCA, NuBus, or PCI), which interconnects subsystems such as a central processor 14, which may be an 80x86, 68xxx, RISC or other suitable microprocessor family, system memory 16, which may be RAM, ROM or a combination thereof, input/output (I/O) controller 18, an external device such as serial port 28 and parallel ports 32, detachable keyboard 30, mouse 26, fixed disk drive 32, which may be a hard disk drive or an optical drive or a CD-ROM drive or other suitable medium, and floppy disk drive 33 operative to receive a floppy disk.

Network connections are usually established through a device such as a network adapter 44 attached to one of the buses or a modem on a serial port. Network adapters may include 10 base T, 100 Base T, optical, ATM, DSL, or other network formats.

MPEG Decoder 36 and Audio subsystem 42 coupled via bus 12 provide multimedia capability.

Many other devices can be connected such as fax 38 connected via serial port 28, touch screen 40 connected directly, infrared peripheral support 34 or printer 20, connected through parallel port 22. Other devices or subsystems (not shown) may be connected in a similar manner. Also, it is not necessary for all of the devices shown in FIG. 2A to be present to practice the present invention, as discussed below. The devices and subsystems may be interconnected in different ways from that shown in FIG. 2A without impairing the operation of the system. Source code to implement processing functions in accordance with the present invention may be operably disposed in system memory 16 or stored on storage media such as fixed disk 32 or floppy disk 33.

Video interface 24 may be any standard video format, such as S-Video. Various forms of user input devices may be used with the settop unit. For example, a touch screen allows a user to point to objects on the screen to select an object and to move the selected object by pointing to a second position on the screen. Alternatively, an infrared or other coupled remotable hand held control unit may be interfaced with the settop box allowing the user to interact with the unit, make changes, and indicate preferences. Various buttons and controls may be displayed on the screen for activation by using the mouse or touch screen.

Figure 2B:
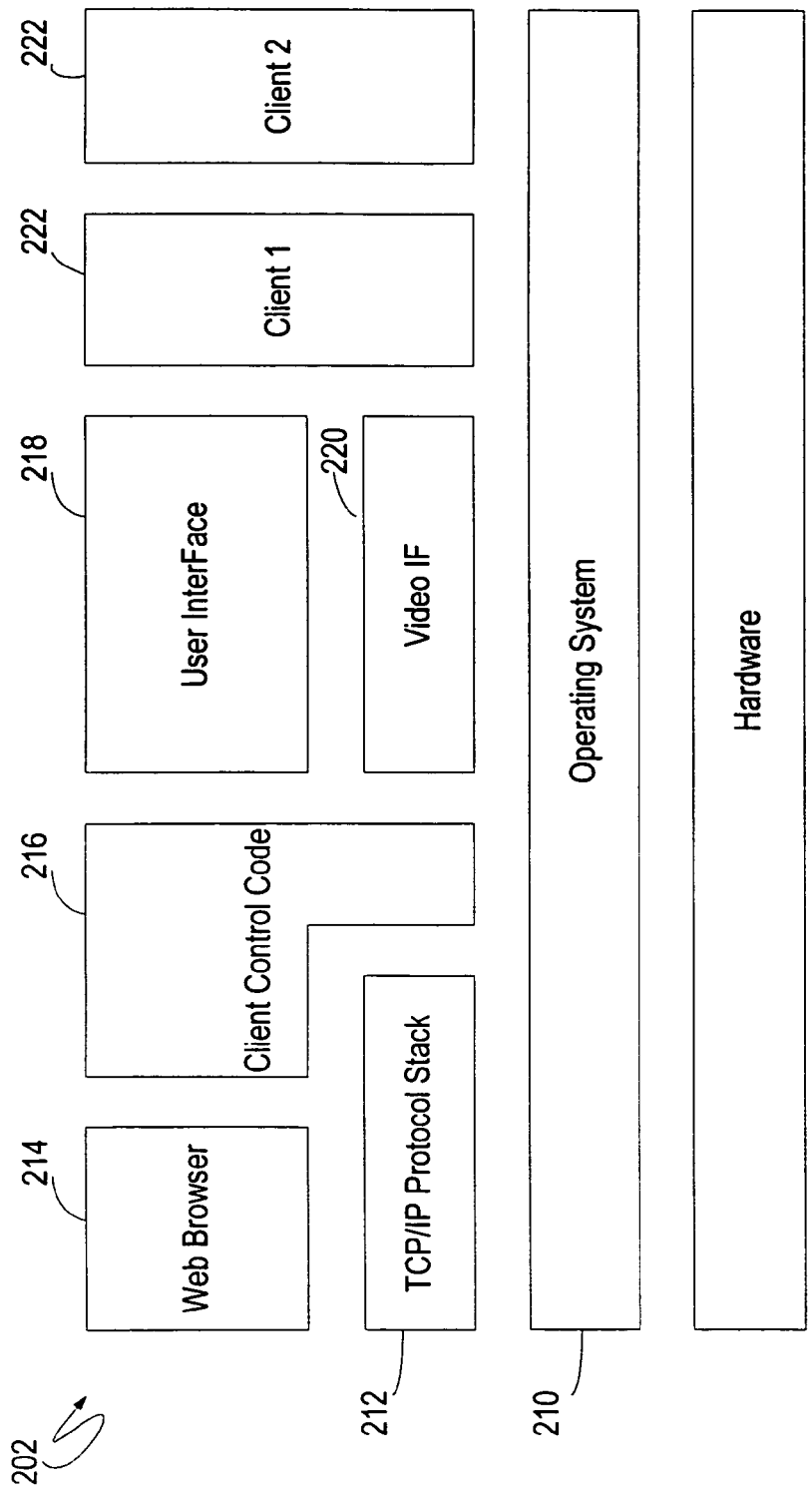
FIG. 2B depicts a functional view of settop box software in accordance with a particular embodiment of the invention.

As depicted by block diagram 202 in FIG. 2B, operatively disposed in memory 16, or resident on fixed disk 32, operating system software 210, may be PSOS, DOS, UNIX, WINDOWS95, WINDOWS CE, or other operating systems known in the art. Executing concurrently and cooperatively with operating system software 210, IP Multicast capable TCP/IP software 212 manages the flow of information into and out of the settop unit over the network interface 44. A JAVA enabled Internet browser 214, such as Netscape Navigator™, Microsoft Explorer™ or their equivalent in the art provide a web-browser user interface to networked resources through TCP/IP software 212. Client control code 216 implements functions specific to the settop box operation, such as the processes depicted herein in FIG. 4D and described hereinafter. Output to the users set is provided by user interface 218 in conjunction with Video Interface Code 220. Other clients 222 such as Email, facsimile, video conferencing applications or voice mail are also supported.

In a related embodiment, the functions of the settop unit are integrated into a television, forming an Internet capable, interactive "Smart Television."

In a related embodiment, the functions of the settop unit are integrated into a personal computer, forming an Internet capable, interactive "Workstation Television."

Software Overview: Protocols

The Internet protocol (IP), which forms the basis of all other protocols in the Transmission Control Protocol/Internet Protocol (TCP/IP) protocol suite, has three operating modes of transmitting and receiving information: unicast, broadcast, and multicast. In the most familiar of these, unicast, information flows from a single source host to a single destination host. The destination address within the IP packet header specifies a specific host address in a unicast. Two hosts communicating in this manner do not share information with any of the remaining hosts on the line. A second type of service called broadcast is used when a host desires to send a frame to every other host on the wire. Broadcasting is a single source to all destinations on the wire paradigm. Finally, multicasting fits between unicasting and broadcasting. In multicasting, information packets are delivered only to the set of hosts that belong to a multicast group.

Figure 3A:
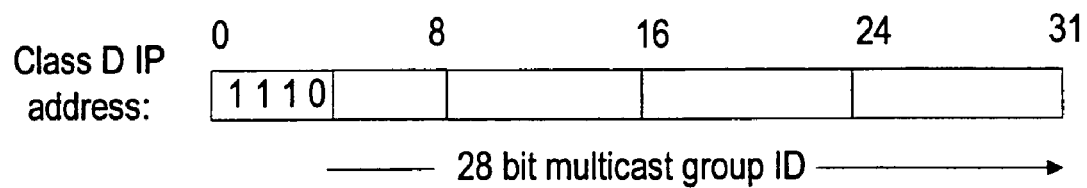
FIG. 3A depicts a class D IP address suitable for IP multicasting.

FIG. 3A depicts the format of a class D IP address used in multicasting applications. An IP multicast application will specify an IP host group address, rather than an individual IP address, in the destination field. As depicted in FIG. 3A, the IP host group address has its first four highest order bits permanently fixed to 1110. This yields a dotted decimal notation range of 224.0.0.0 to 239.255.255.255. The remaining 28 bits in the address comprise the multicast group identifier.

An IP multicast may be used to deliver digitized information such as video conferencing or television to an end user host. Since multicasting directs the same packets of information to multiple destinations simultaneously, it is more efficient than a unicasting model which sends separate copies to each individual destination. Other benefits of multicasting include: (1) The sender need only send one copy of the information packet. (2) The information is delivered in a more timely synchronized fashion because all destinations receive the same source packet. (3) Multicasting may be used to send information to destinations whose individual addresses are unknown to the sender, thus reducing the overall number of packets in the network.

Figure 3B:
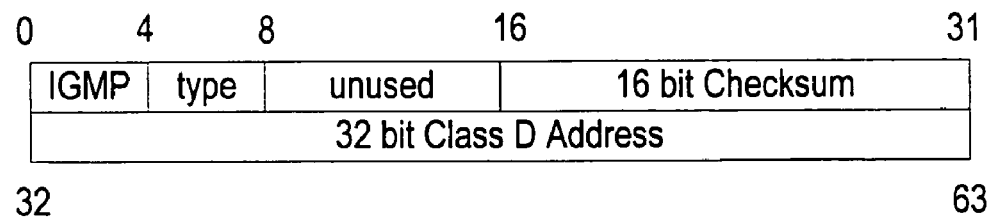
FIG. 3B depicts an IGMP protocol message for use with IP.

A fundamental aspect of implementing a multicast system is the concept of end user hosts joining multicast groups. This is accomplished by means of an Internet Group Management Protocol (IGMP) transaction. FIG. 3B depicts the format of an IGMP message. IGMP messages are always eight bytes in length. They begin with a four bit IGMP version which is currently "1" in contemporary releases of TCP/IP. Next follows a four bit IGMP type field. Type fields may be a "1" indicating a query sent by a multicast router, or a "2" indicating a response sent by a host. The next eight bits are unused. Bits 16 through 31 form a 16 bit checksum. Bits 32 through 64 comprise a 32 bit group address.

Multicast traffic is managed throughout a network using exchanges of queries and reports between hosts and routers on the network. An Internet host sends an IGMP report when it first joins a multicast group. A router receiving such a report will update its internal table of interfaces for the interface of the multicast group which the host has requested to join. Subsequently, whenever the router receives a multicast datagram, it forwards the datagram only to the interfaces having hosts belonging to corresponding multicast groups. Additionally, routers will send out IGMP queries at regular intervals to see if any hosts continue to belong to any groups. The router will send one query out each interface. In this fashion, IGMP transactions are used to track membership in multicast groups by multicast routers.

Multicast conference sessions are announced using Session Announcement Protocol (SAP). An SAP server that announces a conference session periodically multicasts an announcement packet to a well known multicast address and port. The announcement is multicast with the same scope, as defined by group address range or Time To Live (TTL) field, as the session it is announcing. (Multicasts with the TTL field set to 0 are restricted to their sending hosts' IP subnet; while those with larger values for TTL will be forwarded to other subnets by routers.) This ensures that the recipients of the announcement can also be potential recipients of the session the announcement describes, bandwidth and other such constraints permitting. This is also important for the scalability of the protocol, as it keeps local session announcements local. The time period between one announcement and its repetition is dependent on two factors—the scope (TTL) of the session, and the number of other sessions currently being announced by other session directory clients.

A session announcement is simply multicast to the appropriate well known multicast address and port. The announcement contains a session description and, optionally, an authentication header. The session description may be encrypted. Multicast addresses 224.2.127.254, for SAP version 1 announcements; 224.2.127.255, for SAP version 0 announcements; and 224.2.128.0 to 224.2.255.255, for SAP Dynamic Assignments, are reserved for the session announcement protocol. Multicast address assignments are more fully described in, Deering, S., "Host Extensions for IP Multicasting", STD 5, RFC 1112, Stanford University, August 1989, which is incorporated herein by reference in its entirety for all purposes.

Content transmission based upon the unicast model in a particular embodiment of the present invention employs the Hyper Text Transfer Protocol (HTTP). The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet. User requests for data objects are made by means of an HTTP request, such as a GET request. A GET request as depicted below is comprised of 1) an HTTP protocol version, such as "http:/1.0"; followed by 2) the full path of the data object; followed by 3) the name of the data object. In the GET request shown below, a request is being made for the data object with a path name of "/pub/" and a name of "MyData.html":

HTTP-Version GET /pub/MyData.html (1)

Processing of a GET request entails the establishing of an TCP/IP connection with the server named in the GET request and receipt from the server of the data object specified. Subsequently, the TCP/IP connection with the server is terminated.

Distributing Digital Programming

Figure 4B:
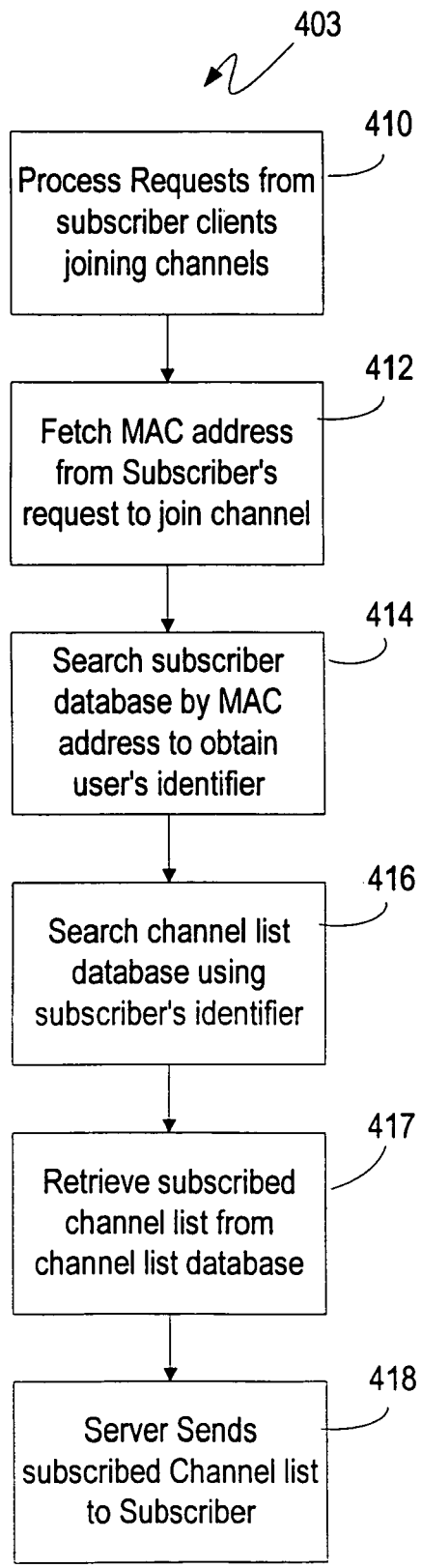
FIGS. 4A-4C depicts processing steps in a representative central office.
Figure 4A:
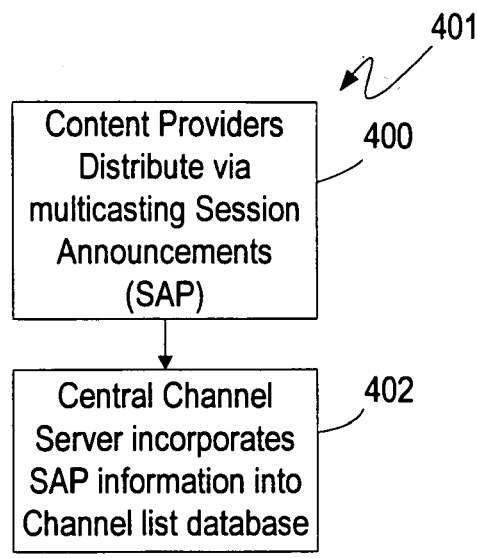
Figure 4C:
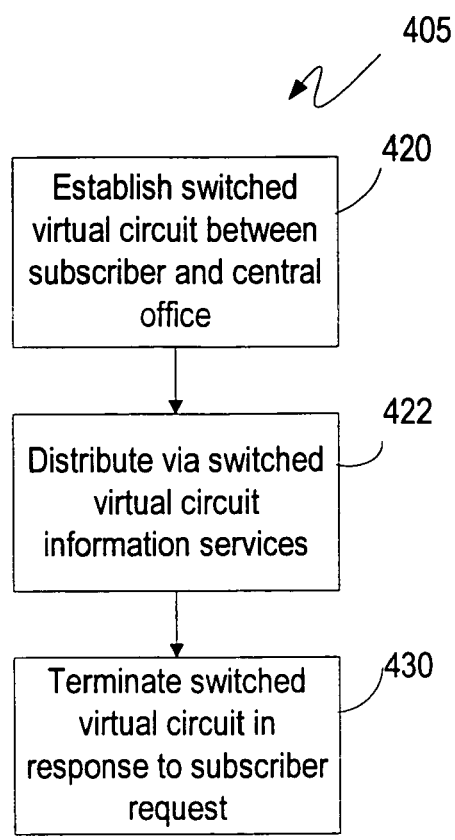

FIGS. 4A, 4B and 4C depict processing steps which occur in a typical central office according to a particular embodiment of the invention. In flow chart 401, processing step 400, each content provider sends to the centralized channel server session announcement information, comprising its own unique identifier, further comprising the channel source address, which can be an IP address for example, or perhaps an ATM Virtual Path (VP), and transmission circuit, which can be a User Datagram Protocol (UDP) port for example, or perhaps an ATM Virtual Channel (VC), and, in a preferable embodiment, a brief content descriptor, which may be a segment of the actual program. The session announcement information is sufficient to enable a settop box subscriber to access a particular content provider to receive content information packets. The channel server, in conjunction with the channel database, tracks the identifier source and address information of the content providers.

Flow chart 403 of FIG. 4B depicts a set of verification steps that the channel server will undertake responsive to a subscriber request for a particular program. In accordance with a particular embodiment, subscriber requests may be made of the channel server by unicast from a settop box in the subscriber's residence. Beginning with step 410, the channel server seeks to determine the identification of the subscriber making such request and the particular channels permitted to this subscriber. In step 412, the channel server will fetch the address from the subscriber's incoming request. In alternative embodiments, this address information may be the Media Access Control (MAC) address associated with the user's network adapter, or in cases where there is no MAC address, such as an ATM network, the IP address associated with the end user's unit may be obtained from the packet. Next, in step 414, the channel server searches a database of customers, using the subscriber's address information as the search key, to determine the subscriber's unique identification in the network. In step 416 the subscriber's identification is used to search a subscribed channel list database. In step 417, the subscribed channel list is retrieved by the channel server. The subscribed channel list contains a listing of programming content which is both 1) being offered by a content provider; and 2) permitted to be viewed by the requesting subscriber. In step 418, the server sends the subscribed channel list to the settop box of the subscriber via unicast. The result is that the subscriber at the settop box is only able to view programming content for which the subscriber has permission to access. Subsequently, subscribers will make a choice of programming by their settop box. This choice is then communicated from the settop box back through the network in the form of a request to receive a particular channel. In a preferable embodiment, this request may be made by an IGMP request to join a multicast group associated with the particular channel. In an alternative embodiment, an hyper text transfer protocol (HTTP) request to get a particular uniform resource locator (URL) of a particular channel may also be used.

In related embodiments, step 413 (not shown) is interposed between steps 412 and 414. In step 413, the Address Resolution Protocol (ARP) is used to obtain a MAC address from an IP address obtained from the packet. The resulting MAC address can then be used to search the subscriber database in step 414. In another related embodiment, in step 413, the Reverse Address Resolution Protocol (RARP) is used to translate a MAC address to an IP address. The resulting IP address can then be used to search the subscriber database in step 414.

FIG. 4C, flow chart 405 depicts processing of incoming requests by subscribers to receive a particular channel. In step 420, an IP level conversation is established between the channel content provider and a particular subscriber. In step 422, channel programming content flows via a switched virtual circuit from the content provider via the central office to the subscriber's settop box. In a preferable embodiment, digital video and channel content are distributed to the subscriber's settop box by way of multicasting. In an alternative embodiment, a unicast model may be used in which a dedicated TCP/IP connection exists between a settop box and the content provider. Some time later, responsive to a subscriber request in step 430, the conversation between the subscriber's settop box and the content provider is terminated.

Figure 4D:
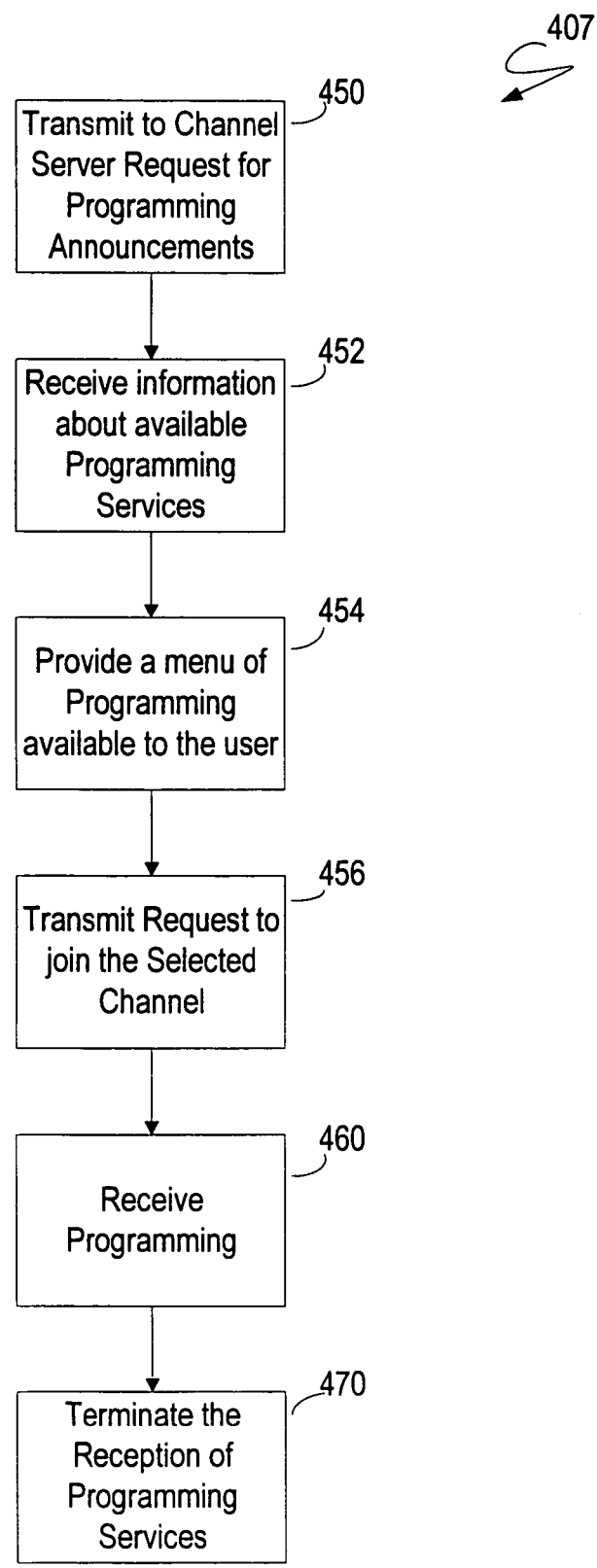
FIG. 4D depicts processing steps in a representative settop box.

Flowchart 407 of FIG. 4D depicts the processing steps of a representative settop box in accordance with a particular embodiment of the invention. The settop box is preconfigured to transmit by unicast to the channel server, a request for programming announcement information, as depicted in step 450 of flowchart 407. Note that this request will carry with it the address information of the user's settop unit, which may be, in alternative embodiments, the Media Access Control (MAC) address associated with the user's network adapter, or in cases where there is no MAC address, such as an ATM network, the IP address associated with the end user's unit obtained from the packet. The channel server will respond with a subscriber channel list, as depicted in flow chart 403 of FIG. 4B and described hereinabove. The settop box receives information about programming content for which the settop box subscriber is permitted to access to in step 452. The information received in step 452 by the settop box is organized in step 454 as a menu and presented to the user by graphical user interface.

In a related embodiment, MAC addresses may be used as subscriber identifiers on ATM networks by encapsulating the MAC addresses in ATM cells, such as AAL5 cells, to move them across the network. Encapsulating information in ATM cells is well known to those of ordinary skill in the art, and is more fully detailed in references such as, George Sackett & Christopher Metz, "ATM and Multiprotocol Networking", 1996.

Responsive to the user's selection of desired programming content, the settop box transmits a request back through the network for a particular channel in step 456. In a preferable embodiment, this join request may be implemented by an IGMP protocol request to join a multicast group. In an alternative embodiment, an HTTP protocol GET request may be made for the specific uniform resource indicator of the particular channel. Subsequently, in step 460, the settop box receives program content from the content provider via a switched virtual circuit established through the central office. In a preferable embodiment, the transport of video information to the end user is accomplished via multicasting. In an alternative embodiment, video information may be received from the central office via point-to-point TCP connection.

After some time, the user may indicate to the settop box, the desire to change or terminate receiving programming content. In step 470, the settop box terminates the switched virtual circuit upon such notice by the user. In a preferable embodiment, this is accomplished by means of an IGMP request to leave the multicast group of the host providing the content. In an alternate embodiment, this can be a TCP Abort or TCP Close request to sever a unicast connection between the content provider and the settop box.

Figure 4E:
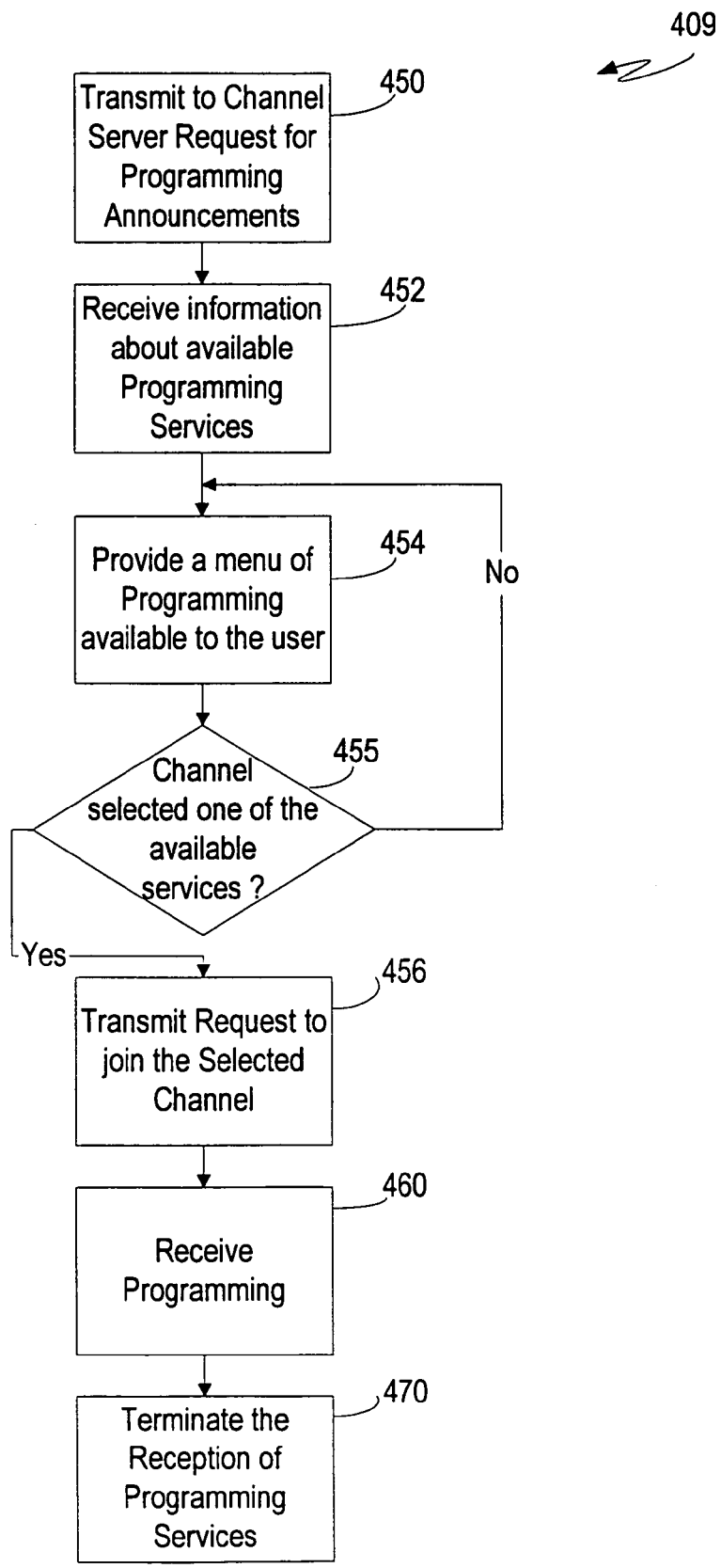
FIG. 4E depicts processing steps in an alternative embodiment settop box.

In the related embodiment depicted by flow chart 409 in FIG. 4E, decisional step 455 shows processing within the settop box to check if the channel requested by the user, either multicast group in the preferable embodiment, or uniform resource indicator in an alternate embodiment, is a member of the most recent channel list sent from the channel server. If it is not a member, then the system has detected an intrusion attempt by the subscriber and declines to process the subscriber's selection request. The remainder of the processing steps in this embodiment closely mirror the steps in the embodiment depicted by flow chart 407 in FIG. 4D.

In a related embodiment, processing will truncate IP header information from video content carried entirely over switched networks to save bandwidth. Headers are prepended to information by the various entities comprising the TCP/IP protocol stack to contain information useful to non-switched networks in routing the packet. For example, IP headers contain a source and destination address. UDP headers contain network addresses and ports. These headers are of a standard size and layout, which are well known to those of ordinary skill in the art. Packets flowing on a switched virtual circuit travel along a point to point link, and therefore have no need for the routing information contained within the IP header. ATM networks are one example of networks using virtual circuits. Thus, whenever information packets cross a border onto a virtual circuit network, the border entity, which may be for example a router or an ATM edge machine, perhaps, can strip off these prepended headers.

The invention has now been explained with reference to specific embodiments. Other embodiments will be apparent to those of ordinary skill in the art. It is therefore not intended that the invention be limited except as indicated by the appended claims.

What is claimed is:

1. A method in a computer system for distributing lists of available channels to subscriber units, each channel being assigned an IP multicast group, the method comprising:
   receiving from a subscriber unit a request for a list of available channels, the request including information identifying a subscriber and being sent using HTTP protocol; and
   upon receiving the request,
      identifying one or more available channels that the identified subscriber is permitted to access; and
      sending to the subscriber unit a response to the received request with an indication of the identified channels, the response being sent using HTTP protocol and identifying the IP multicast group assigned to each identified channel.

2. The method of claim 1 whereby when the subscriber selects to access a channel indicated in the response, the subscriber unit sends to an IP router a request to join the IP multicast group assigned to the channel selected to be accessed and whereby the IP router routes data of the selected channel to the subscriber unit, the request to join the IP multicast group being an Internet Group Management Protocol (IGMP) request.

3. The method of claim 1 wherein the identifying of one or more available channels identifies less than all available channels.

4. The method of claim 1 wherein the response is sent via unicast to the subscriber unit.

5. The method of claim 1 wherein available channels are provided to the computer system by receiving from a plurality of content providers indications of channels that are made available by each content provider.

6. The method of claim 5 wherein an indication that a channel is made available by a content provider is sent using a session announcement protocol.

7. The method of claim 5 wherein each available channel has a channel source address that is provided by a content provider of the plurality of content providers.

8. The method of claim 7 wherein the channel source address is an IP address.

9. The method of claim 7 wherein the channel source address is an ATM channel.

10. The method of claim 7 wherein the channel source address is an ATM virtual path and transmission circuit.

11. The method of claim 1 wherein when the subscriber selects to receive an available channel indicated in response, the subscriber unit sends a request to join the IP multicast group associated with the selected channel, the subscriber unit adapted to leave the IP multicast group via a sent Internet Group Management Protocol (IGMP) request to leave the multicast group.

12. The method of claim 1 wherein the computer system is located at a central office.

13. The method of claim 12 wherein the subscriber unit is connected to the computer system via a DSL connection.

14. The method of claim 1 wherein an available channel is a channel whose data is currently being multicasted.

15. The method of claim 1 wherein the subscriber is identified using a media access control address, the media access control address obtained from an Internet Protocol address via an Address Resolution Protocol.

16. The method of claim 1 wherein the subscriber is identified using an IP address.

17. The method of claim 1 including providing a subscribed channel list for the subscriber that indicates channels which the subscriber is permitted to access.

18. The method of claim 1 wherein data for a channel is received at the computer system and forwarded to the subscriber unit.

19. The method of claim 18 wherein data received at the computer system is sent via a switched virtual circuit.

20. The method of claim 1 wherein a multicast group is identified by an IP address.

21. The method of claim 1 wherein the request is sent in response to the subscriber requesting to view the list.

22. A method in a computer system for distributing lists of available channels to subscriber units, the method comprising:
   receiving from a subscriber unit a request for a list of available channels, the request including information identifying a subscriber and being sent using HTTP protocol; and
   upon receiving the request,
      identifying one or more channels that the identified subscriber is authorized to access; and
      sending to the subscriber unit a response with an indication of the identified channels, the response being sent using HTTP protocol and identifying a IP multicast group assigned to each identified channel, the response managed via IP multicast capable TCP/IP software.

23. The method of claim 22 wherein the identifying of one or more available channels identifies less than all available channels.

24. The method of claim 22 wherein the response is sent via unicast to the subscriber unit.

25. The method of claim 22 wherein available channels are provided to the computer system by receiving from a plurality of content providers indications of channels that are made available by that content provider.

26. The method of claim 22 wherein the computer system is located at a central office.

27. The method of claim 26 wherein the subscriber unit is connected to the computer system via a DSL connection.

28. The method of claim 22 wherein the subscriber is identified using a media access control address, the media access control address translated to an Internet Protocol address via a Reverse Address Resolution Protocol.

29. The method of claim 22 wherein the subscriber is identified using an IP address.

30. The method of claim 22 including providing a subscribed channel list for the subscriber that indicates channels which the subscriber is permitted to access.

31. The method of claim 22 wherein data for a channel is received at the computer system and forwarded to the subscriber unit.

32. The method of claim 31 wherein data received at the computer system is sent via a switched virtual circuit.

33. The method of claim 22 wherein the request is sent in response to the subscriber requesting to view the list.

34. A method in a computer system for distributing lists of available channels to subscriber units, each channel being assigned an IP multicast group, the method comprising:
   receiving from a subscriber unit a request for a listing of available channels, the request being sent in response to a subscriber indicating to view the listing, the request being sent using HTTP protocol; and
   upon receiving the request, identifying channels that are available to be accessed; and via a channel server, sending to the subscriber unit a response with an indication of the identified channels, the response being sent using HTTP protocol and identifying the IP multicast group assigned to each identified channel, the response managed via IP multicast capable TCP/IP software.

35. The method of claim 34 whereby when the subscriber selects to access a channel indicated in the response, the subscriber unit sends to an IP router a request to join the multicast group assigned to the channel selected to be accessed and whereby the IP router routes data of the selected channel to the subscriber unit.

36. The method of claim 34 wherein the response is sent via unicast to the subscriber unit.

37. The method of claim 34 wherein available channels are provided to the computer system by receiving from a plurality of content providers indications of channels that are made available by each content provider.

38. The method of claim 37 wherein an indication that a channel is made available by a content provider is sent using a session announcement protocol.

39. The method of claim 37 wherein each available channel has a channel source address that is provided by a content provider of the plurality of content providers.

40. The method of claim 39 wherein the channel source address is an IP address.

41. The method of claim 39 wherein the channel source address is an ATM channel.

42. The method of claim 39 wherein the channel source address is an ATM virtual path and transmission circuit.

43. The method of claim 34 wherein when the subscriber selects to receive an available channel indicated in a response, the subscriber unit sends a request to join the multicast group associated with the selected channel.

44. The method of claim 34 wherein the computer system is located at a central office.

45. The method of claim 34 wherein the subscriber unit is connected to the computer system via a DSL connection.

46. The method of claim 34 wherein an available channel is a channel whose data is currently being multicasted.

47. The method of claim 34 wherein data for a channel is received at the computer system and forwarded to the subscriber unit.

48. The method of claim 47 wherein data received at the computer system is sent via a switched virtual circuit.

49. The method of claim 34 wherein the multicast group is identified by an IP address.

50. The method of claim 34 wherein the request is sent in response to the subscriber requesting to view the listing.

51. A method in a computer system for distributing lists of available channels to subscriber units, each channel being assigned an IP address, the method comprising:

receiving from a subscriber unit a request for a list of available channels, the request being sent using HTTP protocol and in response to a subscriber requesting to view the list; and upon receiving the request,
identifying one or more channels; and
sending to the subscriber unit a response with an indication of the identified channels, the response being sent using HTTP protocol and identifying the IP multicast group assigned to each identified channel, the response managed via IP multicast capable TCP/IP software.

52. The method of claim 51 wherein the response is sent via unicast to the subscriber unit.

53. The method of claim 51 wherein available channels are provided to the computer system by receiving from a plurality of content providers indications of channels that are made available by each content provider.

54. The method of claim 51 wherein the computer system is located at a central office.

55. The method of claim 54 wherein the subscriber unit is connected to the computer system via a DSL connection.

56. The method of claim 51 wherein data for a channel is received at the computer system and forwarded to the subscriber unit.

57. The method of claim 56 wherein the response is sent via unicast to the subscriber unit.

58. The method of claim 57 wherein an indication that a channel is made available by a content provider is sent using the session announcement protocol.

59. The method of claim 57 wherein each available channel has a channel source address that is provided by a content provider of the plurality of content providers.

60. The method of claim 58 wherein the channel source address is an IP address.

61. The method of claim 58 wherein the channel source address is an ATM channel.

62. The method of claim 58 wherein the channel source address is an ATM virtual path and transmission circuit.

63. The method of claim 56 wherein available channels are provided to the computer system by receiving from a plurality of content providers indications of channels that are made available by each content provider.

64. The method of claim 56 wherein when the subscriber selects to receive an available channel indicated in a response, the subscriber unit sends a request to join a multicast group associated with the selected channel.

65. The method of claim 64 wherein the subscriber unit is connected to the computer system via a DSL connection.

66. The method of claim 56 wherein the computer system is located at a central office.

67. The method of claim 56 wherein an available channel is a channel whose data is currently being multicasted.

68. The method of claim 56 wherein the subscriber is identified using a media access control address.

69. The method of claim 56 wherein the subscriber is identified using an IP address.

70. The method of claim 56 including providing a subscribed channel list for the subscriber that indicates channels which the subscriber is permitted to access.

71. The method of claim 70 wherein data received at the computer system is sent via a switched virtual circuit.

72. The method of claim 56 wherein data for a channel is received at the computer system and forwarded to the subscriber unit.

73. The method of claim 56 wherein a multicast group is identified by an IP address.

74. The method of claim 56 wherein the request is sent in response to the subscriber requesting to view the listing.

75. A method in a computer system for distributing lists of available channels to subscriber units, data of the channels being transmitted via multicasting, the method comprising:

receiving from a subscriber unit a request for a listing of available channels, the request including information identifying a subscriber; and upon receiving the request,
identifying one or more channels that the identified subscriber is permitted to access; and via a channel server, sending to the subscriber unit a response via session announcement protocol with an indication of the identified channels, the response identifying an IP multicast group assigned to each identified channel sent using HTTP protocol and identifying the IP multicast group assigned to each identified channel, the response managed via IP multicast capable TCP/IP software.

76. The method of claim 56 whereby when the subscriber selects to access a channel indicated in the response, the subscriber unit sends to an IP router a request to join a multicast group assigned to the channel selected to be accessed and whereby the IP router routes data of the selected channel to the subscriber unit.

77. The method of claim 75, further comprising:
from a session announcement protocol server, announcing a conference session, via a periodic multicasted announcement packet, the announcement packet having a same group address range field as the conference session, the conference session available via the subscriber unit.

* * * * *